(12) United States Patent
Sakamoto et al.

(10) Patent No.: US 6,218,481 B1
(45) Date of Patent: Apr. 17, 2001

(54) ACETYLIDE-FORM PROPARGYL-CONTAINING EPOXY RESIN COMPOSITION FOR CATIONIC ELECTROCOATING

(75) Inventors: Hiroyuki Sakamoto, Kobe; Toshitaka Kawanami, Hyogo; Ichiro Kawakami, Takatsuki; Takayuki Kokubun, Suita; Takao Saito; Saori Yoshimatsu, both of Toyonaka, all of (JP)

(73) Assignee: Nippon Paint Co., LTD, Osaka (JP)

( * ) Notice: Subject to any disclaimer, the term of this patent is extended or adjusted under 35 U.S.C. 154(b) by 0 days.

(21) Appl. No.: 09/358,840

(22) Filed: Jul. 22, 1999

(30) Foreign Application Priority Data

Jul. 22, 1998 (JP) .................................................. 10-206515
Jul. 22, 1998 (JP) .................................................. 10-206516

(51) Int. Cl.[7] ......................... C08G 59/14; C08G 59/16; C08G 59/17; C08K 3/20; C08L 63/10
(52) U.S. Cl. ....................... 525/502; 523/414; 525/501.5; 525/505; 525/529; 525/530; 525/531; 528/109; 528/110
(58) Field of Search .............................. 523/414; 525/505, 525/529, 502, 501.5, 530, 531; 528/109, 110

(56) References Cited

U.S. PATENT DOCUMENTS 5,242,996 * 9/1993 Yamada et al. ...................... 525/529
5,324,807 * 6/1994 Yamada et al. ...................... 525/523
6,106,684 * 8/2000 Kawakami et al. .................. 204/504

FOREIGN PATENT DOCUMENTS 4-15215 * 1/1992 (JP) .
404028712 * 1/1992 (JP) .

* cited by examiner

Primary Examiner—Robert E. L. Sellers
(74) Attorney, Agent, or Firm—Connelly Bove Lodge & Hutz LLP

(57) ABSTRACT

An acetylide-form propargyl-containing resin composition for cationic electrocoating, which comprises a resin having a skeleton of epoxy resin and has a number average molecular weight of 500 to 20,000, and which contains, per 100 grams of the resin composition solids, 5 to 400 millimoles of sulfonium group and 10 to 495 millimoles of propargyl group, the total content of the sulfonium and propargyl groups being not more than 500 millimoles per 100 grams of the resin composition solids, said propargyl group being partly in the form of an acetylide. This resin composition may further contain unsaturated double bonds.

13 Claims, 1 Drawing Sheet

ACETYLIDE-FORM PROPARGYL-CONTAINING EPOXY RESIN COMPOSITION FOR CATIONIC ELECTROCOATING

FIELD OF THE INVENTION

The present invention relates to a resin composition for cationic electrocoating which contains a catalyst metal in an acetylide form, to a process for producing the same, and to a cationic electrocoating composition.

PRIOR ART

Cationic electrocoating can provide substrates or coating target articles with coating every nook and cranny even when said substrates are complicated in form or shape and can be performed automatically and continuously. Therefore, it is in general use as a technique of forming an undercoat on substrates, such as automotive bodies, which have a large size and are complicated in form or shape and are required to be highly resistant to corrosion. Furthermore, said technique is very highly efficient from the coating composition consumption viewpoint, hence economical, as compared with other methods of coating and, therefore, it has come into wide use as an industrial method of coating.

Cationic electrocoating is carried out by immersing a substrate, which is to serve as a cathode, in a cationic electrocoating composition and applying a voltage. The deposition of a coating layer on the substrate involves electrochemical reaction and the coating layer that has deposited on the substrate surface upon voltage application has an insulating property. Therefore, with the progress of deposition of the coating in the process of coating, hence with the increase in deposit layer thickness, the electric resistance of the coating layer increases in proportion to the increase in layer thickness. As a result, the deposition of the coating composition at that site decreases and, instead, the deposition of a coating layer on some other uncoated site begins. In this way, the deposition of emulsion particles of the coating composition takes place successively from uncoated site to uncoated site. In the present specification, such successive formation of a coating on uncoated sites of a substrate is referred to as "throwing power".

Such cationic electrocoating is generally used in undercoat formation, mainly for the purpose of rust prevention and, therefore, it is required that even substrates having a complicated structure should be provided with a coating having a certain predetermined film thickness at any part thereof. For this reason, sufficient levels of throwing power are to be secured.

As a cationic electrocoating composition excellent in throwing power, WO 98/03701 for instance discloses a cationic electrocoating composition comprising a basic resin containing a triple bond such as an ethynyl or nitrile group within its molecule.

However, for effecting such cationic electrocoating so as to secure the desired performance characteristics, bath control is important. If bath control is neglected, the desired performance characteristics cannot be secured. Therefore, from the productivity viewpoint, it is very important that coating composition preparation and bath control are easy to perform while sufficient levels of throwing power are secured.

Meanwhile, it is a general practice to use a metal compound as a curing catalyst and, thus, incorporate an organic transition metal complex or an organic acid salt of a transition metal, in such cationic electrocoating compositions. However, when an organic acid transition metal salt is used, the organic acid appears as an anion in the electrolyte bath. To avoid its adverse effect, bath control must be carried out strictly and this results in an increased burden of control. In electrocoating, bath control is generally operated by ultrafiltration. Part of the metal compound added as a catalyst is removed by this ultrafiltration, so that it becomes necessary to adjust and maintain the metal ion concentration in the bath to and at an adequate level.

Furthermore, in cases where an organic acid transition metal salt is used, it is necessary to design the cationic electrocoating composition taking the anion content into consideration and the degree of freedom in the designing is restricted. As regards organic transition metal complexes, they are generally hard to dissolve or disperse in organic solvents or water, offering a problem in that it becomes difficult to prepare coating compositions.

Meanwhile, the cationic electrocoating composition disclosed in the above-cited publication WO 98/03701 is shown to give desired performance characteristics under baking conditions of 180° C.×20 minutes. However, recent years have given much importance to reductions in energy cost in the coating line, hence reductions in total energy in the production process, not only from the economical viewpoint but also from the viewpoint of environmental protection. For these reasons, it is desired that the electrocoating compositions be rendered polyfunctional so that the curability may be improved or the compositions may be designed more freely. In particular, it is desired that a cationic electrocoating composition which is excellent in throwing power and with which excellent curability can be realized under mild conditions be developed.

SUMMARY OF THE INVENTION

In view of the state of the art mentioned above, the present invention has one object to provide a resin composition for cationic electrocoating, a process for producing the same and a cationic electrocoating composition, with or by which the difficulties in bath control and coating composition preparation in the case of a metal compound being added as a curing catalyst can be solved and cationic electrocoating can be carried out with ease.

The present invention has another object to provide a resin composition for cationic electrocoating, a process for producing the same and a cationic electrocoating composition, with or by which a high level of throwing power can be realized and excellent curability and a sufficient level of curing can be attained even under mild baking/curing conditions.

According to its first aspect, the present invention provides an acetylide-form propargyl-containing resin composition for cationic electrocoating, which comprises a resin having a skeleton of epoxy resin and has a number average molecular weight of 500 to 20,000, and which contains, per 100 grams of the resin composition solids, 5 to 400 millimoles of sulfonium group and 10 to 495 millimoles of propargyl group, the total content of the sulfonium and propargyl groups being not more than 500 millimoles per 100 grams of the resin composition solids, said propargyl group being partly in the form of an acetylide.

According to its second aspect, the present invention provides a resin composition for cationic electrocoating, which comprises a resin having a skeleton of epoxy resin and has a number average molecular weight of 500 to 20,000, and which contains, per 100 grams of the resin composition solids, 5 to 400 millimoles of sulfonium group, 10 to 485 millimoles of propargyl group and 10 to 485 millimoles of unsaturated double bond, the total content of the sulfonium and propargyl groups and the unsaturated double bond being not more than 500 millimoles per 100 grams of the resin composition solids, said propargyl group being partly in the form of an acetylide.

According to its third aspect, the present invention provides a process for producing an acetylide-form propargyl-containing resin composition for cationic electrocoating, which comprises the steps of:

(1) reacting an epoxy resin having at least two epoxy groups per molecule with a compound (A) having a functional group capable of reacting with epoxy group and having propargyl group, to obtain a propargyl-containing epoxy resin composition;

(2) reacting the propargyl-containing epoxy resin composition obtained in step (1) with a metal compound to convert part of the propargyl group in said epoxy resin composition into its acetylide form; and (3) reacting the remaining epoxy groups in the epoxy resin composition containing part of the propargyl group in the acetylide form as obtained in step (2) with a sulfide/acid mixture to thereby introduce sulfonium group thereinto.

According to its forth aspect, the present invention provides a cationic electrocoating composition which comprises the above-mentioned resin composition for cationic electrocoating.

DETAILED DESCRIPTION OF THE INVENTION

Figure 1:
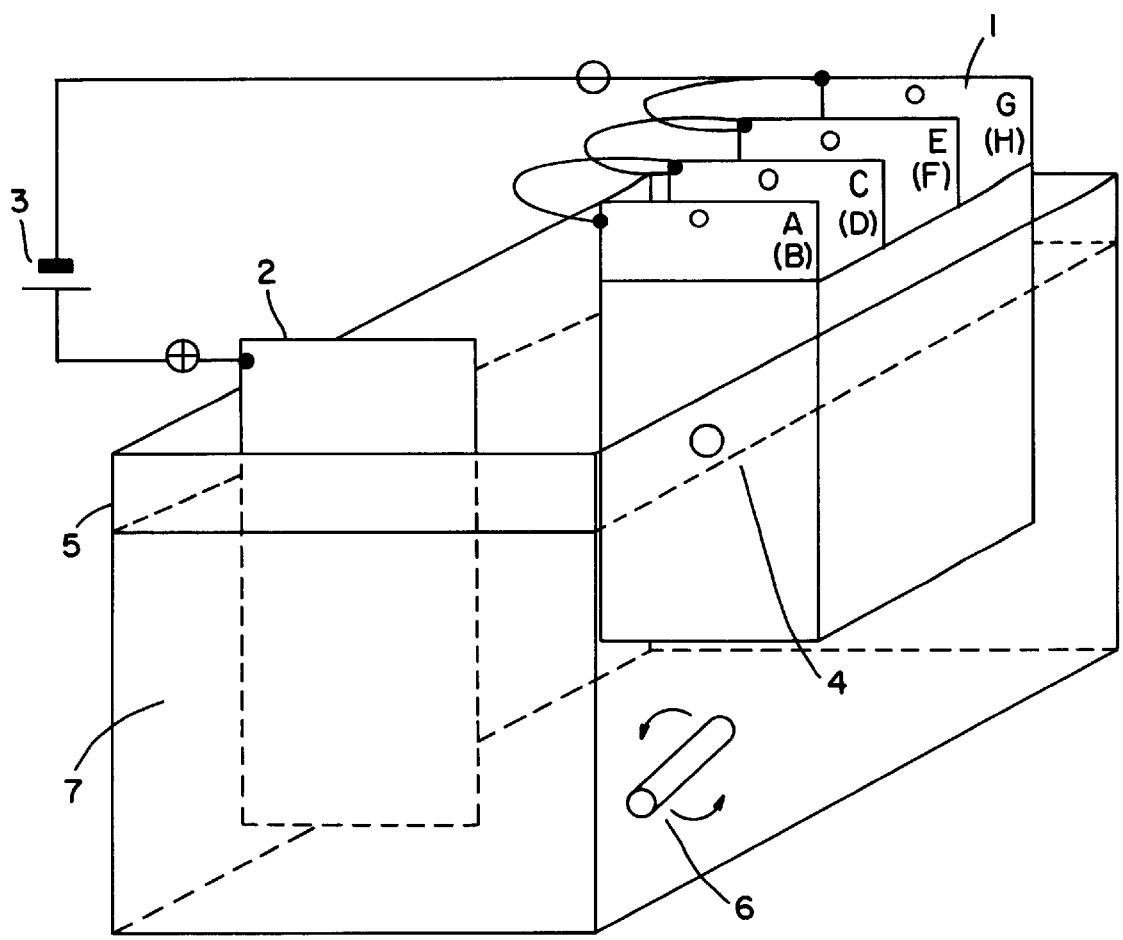
FIG. 1 is a schematic representation of an apparatus for throwing power measurement by so called four-sheet box method. In the figure, the reference numeral 1 indicates sheets to be evaluated (the alphabetical letters indicating respective faces to be evaluated and the alphabetical letters in parentheses indicating the reverse sides), 2-counter electrode, 3-direct current, 4-through-hole, 5-electrodeposition bath, 6-stirrer, and 7-electrocoating composition.

The resin composition for cationic electrocoating according to the first and second aspects of the present invention comprises a resin having a skeleton of epoxy resin. The skeleton-forming epoxy resin is not particularly restricted but can include, among others, epi-bis type epoxy resins, modifications thereof derived by chain extension with a diol, dicarboxylic acid or diamine or the like; epoxidized polybutadiene; novolak phenol type polyepoxy resins; novolak cresol type polyepoxy resins; poly(glycidyl acrylate); poly(glycidyl ether)s derived from aliphatic polyols or polyether polyols; and poly(glycidyl ester)s of polybasic carboxylic acids. Among these, novolak phenol type polyepoxy resins, novolak cresol type polyepoxy resins and poly(glycidyl acrylate) are preferred because of ease of polyfunctionalization for increasing curability. The epoxy resins may partly comprise a monoepoxy resin.

The resin composition for cationic electrocoating according to the first and second aspects of the present invention, which comprises a resin having a skeleton of said epoxy resin, has a number average molecular weight of 500 to 20,000. If the number average molecular weight is less than 500, the cationic electrocoating efficiency will become low.

When it is above 20,000, good coatings cannot be formed on substrate surfaces. A more preferred number average molecular weight range can be found according to the resin skeleton. In the case of novolak phenol type epoxy resins and novolak cresol type epoxy resins, for instance, 700 to 5,000 is a preferred range.

In the resin composition according to the first aspect of the present invention, the resin having a skeleton of the epoxy resin contains sulfonium group and propargyl group each introduced via epoxy group of said skeleton-forming epoxy resin. In the resin composition according to the second aspect of the present invention, there is further unsaturated double bond as introduced therein. In said resin having a skeleton of the epoxy resin, each molecule may contain both of the sulfonium and propargyl groups, or all the three of the sulfonium and propargyl groups and unsaturated double bond, but this is not always necessary. Thus, for instance, in the first aspect of the present invention, each molecule may contain either one of the sulfonium and propargyl groups. In this latter case, resin molecules constituting the resin composition, as a whole, contain both the two kinds of these curing functional groups. Thus, said resin composition for cationic electrocoating may generally be composed of sulfonium- and propargyl-containing resin molecules having a skeleton of epoxy resin, or of a mixture of sulfonium-containing resin molecules and propargyl-containing resin molecules, or of a mixture of all of these. In the present specification, the resin composition for cationic electrocoating contains the sulfonium and propargyl groups according to the above meaning. This also applies to the second aspect of the present invention.

Therefore, a part of said skeleton-forming epoxy resin may have at least one epoxy group per molecule. From the curability viewpoint, however, polyepoxy resins having at least two epoxy groups are preferred. As such, those polyepoxy resins specifically mentioned above can judiciously be used.

Said sulfonium group is a hydratable functional group within the resin composition for cationic electrocoating. When applying a voltage or current at or above a certain level during the electrocoating process, the sulfonium group undergoes electrolytic reduction on an electrode, whereupon the ionic group disappears, so that it can irreversibly become nonconductor, as illustrated below. It can be considered that owing to this fact the resin composition for cationic electrocoating displays a high level of throwing power.

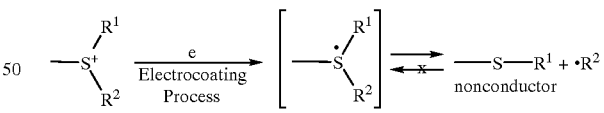

It can also be considered that, during this electrocoating process, electrode reaction is induced and the resulting hydroxide ion is kept by the sulfonium group, thus electrolytically generating a base in the electrodeposition coat. This electrolytically generated base can convert the propargyl group occurring in the electrodeposition coat, which has low thermal reactivity, to allene bond, which has high thermal reactivity.

The content of the sulfonium group is 5 to 400 millimoles per 100 grams of the nonvolatile matter in the resin composition according to the present invention, provided that the conditions concerning the contents of each functional group as mentioned herein should be satisfied. If said content is lower than 5 millimoles per 100 grams, sufficient throwing power or curability can never be obtained and, furthermore, the hydratability and bath stability will be poor. When it is higher than 400 millimoles per 100 grams, the deposition of coatings on substrate surfaces becomes poor. A preferred content range can be specified according to the resin skeleton. In the case of novolak phenol type epoxy resins and novolak cresol type epoxy resins, for instance, a preferred range is 5 to 250 millimoles, more preferably 10 to 150 millimoles, per 100 grams of the resin composition solids.

The propargyl group can be converted to allene bond, as mentioned above, whereby the reactivity can be improved and a curing system can be built up. For unknown reasons, said group can further improve the throwing power of the resin composition, by coexisting with the sulfonium group.

The content of the propargyl group is 10 to 495 millimoles per 100 grams of the solid contents in the case of the resin composition according to the first aspect of the present invention and, in the second aspect, it is 10 to 485 millimoles per 100 grams of the solid contents, provided that the requirements concerning the contents of the respective functional groups as mentioned herein are satisfied. If it is less than 10 millimoles per 100 grams, sufficient throwing power or curability cannot be obtained. If the respective upper limits are exceeded, the hydration stability may be adversely affected when it is used in cationic electrocoating compositions. A more preferred content range may be determined according to the resin skeleton. In the case of novolak phenol type epoxy resins and novolak cresol type epoxy resins, for instance, a range of 20 to 395 millimoles per 100 grams of resin composition solids is preferred in the first aspect and, in the second aspect, a range of 20 to 375 millimoles per 100 grams of resin composition solids is preferred.

The resin composition according to the second aspect of the present invention contains unsaturated double bond. In the present specification, the term "unsaturated double bond" means carbon—carbon double bond. The unsaturated double bond is high in reactivity, so that it can further improve the curability.

The content of the unsaturated double bond in the second aspect of the present invention is 10 to 485 millimoles per 100 grams of the solid content in the resin composition of the present invention, provided that the requirements concerning the contents of the sulfonium and propargyl groups and unsaturated double bond as mentioned herein are satisfied. If it is less than 10 millimoles per 100 grams, no sufficient curability can be realized. If it exceeds 485 millimoles per 100 grams, the hydration stability may be adversely affected when it is used in cationic electrocoating compositions. A more preferred content range may be determined according to the resin skeleton. In the case of novolak phenol type epoxy resins and novolak cresol type epoxy resins, for instance, a range of 20 to 375 millimoles per 100 grams of resin composition solids is preferred.

In the present specification, the content of the unsaturated double bond is expressed in terms of the content of the epoxy group throughwhich the unsaturated double bond has been introduced. Thus, even when a molecule having a plurality of unsaturated double bonds per molecule, for example a long chain unsaturated fatty acid, has been introduced via the epoxy group, the content of the unsaturated double bond is expressed in terms of the content of the epoxy group with said molecule having a plurality of unsaturated double bonds introduced therein. This is because even when a molecule having a plurality of unsaturated double bonds per molecule has been introduced via one epoxy group, substantially only one of these unsaturated double bonds is thought to be involved in the curing reaction.

In the resin composition according to the first and second aspects of the present invention, the total content of the sulfonium and propargyl groups or the total content of the sulfonium and propargyl groups and unsaturated double bond is not more than 500 millimoles per 100 grams of resin composition solids. If it exceeds 500 millimoles, no resin may actually be obtained or the desired performance characteristics may not be obtained. A more preferred content range may be determined according to the resin skeleton. In the case of novolak phenol type epoxy resins and novolak cresol type epoxy resins, for instance, it is preferably not more than 400 millimoles.

In the resin composition according to the second aspect of the present invention, it is further preferred that the total content of the propargyl group and unsaturated double bond be within the range of 80 to 450 millimoles per 100 grams of resin composition solids. If it is less than 80 millimoles, the curability may be insufficient. If it exceeds 450 millimoles, the content of the sulfonium group becomes relatively small, so that the throwing power may possibly become insufficient. A more preferred content range may be determined according to the resin skeleton. In the case of novolak phenol type epoxy resins and novolak cresol type epoxy resins, for instance, it is preferably 100 to 395 millimoles.

Part of the propargyl group in the resin composition of the present invention is in the form of an acetylide. Said acetylide is a metal-acetylene compound similar to a salt. The content of the propargyl group occurring in the acetylide form within said resin composition for cationic electrocoating is preferably 0.1 to 40 millimoles per 100 grams of resin composition solids. If it is less than 0.1 millimole, the effect of the acetylide form may not be produced to a sufficient extent. It is difficult to realize conversion to the acetylide to such an extent that said content exceeds 40 millimoles. It is possible to select a preferred content according to the metal employed.

The metal to be contained in the acetylide-form propargyl group is not particularly restricted provided that the metal selected has catalyst activity. As examples, there may be mentioned transition metals such as copper, silver and barium. Among them, copper and silver are preferred from the environment friendliness viewpoint, and copper is more preferred because of its ready availability. When copper is used, the content of the acetylide-form propargyl group in the resin composition is more preferably 0.1 to 20 millimoles per 100 grams of resin composition solids.

By converting part of the propargyl group in the resin composition of the present invention into the acetylide form, a curing catalyst can be introduced into the resin. By doing so, it is generally possible to readily introduce even a transition metal in the acetylide form without any need of using an organic transition metal complex hardly soluble or dispersible in organic solvents or water. Thus, it is possible to freely use even a hardly soluble transition metal compound in coating compositions. It is further possible to avoid the occurrence of an organic acid salt as an anion in the electrolyte bath, which is the case encountered when an organic acid transition metal salt is used. Furthermore, the metal ion will not be removed by ultrafiltration, and bath control and designing of cationic electrocoating compositions become easy.

The third aspect of the present invention, namely the process for producing the above resin composition for cationic electrocoating, is described in the following.

Said resin composition for cationic electrocoating can be judiciously produced, for example, by the steps of:

(1) reacting an epoxy resin having at least two epoxy groups per molecule with a compound (A) having a functional group capable of reacting epoxy group and having propargyl group, to give a propargyl-containing epoxy resin composition;

(2) reacting the propargyl-containing epoxy resin composition obtained in step (1) with a metal compound to thereby convert part of the propargyl group in said epoxy resin composition into the acetylide form; and (3) reacting the remaining epoxy groups in the epoxy resin composition containing part of the propargyl group in the acetylide form as obtained in step (2) with a sulfide/acid mixture to thereby introduce sulfonium group into said epoxy resin.

Suited for use as the epoxy resin having at least two epoxy groups per molecule are, among others, those polyepoxy resins mentioned above. Among these, novolak phenol type polyepoxy resins, novolak cresol type polyepoxy resins and poly(glycidyl acrylate) are preferred since they can easily be polyfunctionalized for attaining increased curability.

Said epoxy resin having at least two epoxy groups per molecule preferably has a number average molecular weight of 400 to 15,000, more preferably 650 to 12,000.

Said compound (A) having a functional group reactive with epoxy group and having propargyl group (hereinafter, "compound (A)") may be, for example, a compound having a functional group reactive with epoxy group, such as hydroxyl or carboxyl group, together with propargyl group. As specific examples thereof, there may be mentioned propargyl alcohol, propargylic acid or the like. Among these, propargyl alcohol is preferred in view of its ready availability and ease of reaction.

When carbon—carbon double bond is introduced into the resin composition of the present invention, a compound (B) having a functional group reactive with epoxy group and having carbon—carbon double bond (hereinafter, "compound (B)") can be used together with said compound (A) in the step (1). Said compound (B) may be a compound having a functional group capable of reacting with epoxy group, for example hydroxyl group or carboxyl group, and also having carbon—carbon double bond. More specifically, in the case of the group capable of reacting with epoxy group being the hydroxyl group, there may be mentioned 2-hdyroxyethyl acrylate,2-hydroxyethyl methacrylate, hydroxypropyl acrylate, hydroxypropyl methacrylate, hydroxybutyl acrylate, hydroxybutyl methacrylate, allyl alcohol, methallyl alcohol and the like. In the case of the group capable of reacting with epoxy group being the carboxyl group, there may be mentioned acrylic acid, methacrylic acid, ethacrylic acid, crotonic acid, maleic acid, phthalic acid, itaconic acid; half esters such as maleic acid ethyl ester, fumaric acid ethyl ester, itaconic acid ethyl ester, succinic acid mono(meth)acryloyloxyethyl ester, phthalic acid mono(meth)acryloyloxyethyl ester, etc.; synthetic unsaturated fatty acids such as oleic acid, linolic acid and ricinolic acid; linseed oil, soybean oil and other natural unsaturated fatty acids, among others.

In the above step (1), said epoxy resin having at least two epoxy groups per molecule is reacted with the compound (A) to give a propargyl-containing epoxy resin composition or, as the case may be, said epoxy resin is reacted with the compound (A) and compound (B) to give a propargyl- and carbon—carbon double bond-containing epoxy resin composition. In this latter case, said compound (A) and compound (B) may be mixed together in advance and submitted to the reaction in step (1), or the compound (A) and compound (B) may be separately submitted to the reaction in said step. The functional group of said compound (A) which is to react with the epoxy group and the functional group of said compound (B) which is to react with the epoxy resin may be the same or different.

In step (1), the proportions of the compound (A) and compound (B) to be submitted to reaction may be determined so as to give desired functional group contents, for instance to give the above-mentioned contents of the propargyl group and that of the carbon—carbon double bond.

As for the reaction conditions in step (1), the reaction is generally carried out at room temperature or a temperature of 140° C. or below for several hours. If necessary, one or more known components, such as a catalyst and/or a solvent, may be used to allow the reaction to proceed. The end point of the reaction can be confirmed by determining the epoxy equivalent, and the functional groups introduced can be identified by nonvolatile matter determination or instrumental analysis of the resin composition obtained. Generally, the thus-obtained reaction product is a mixture of epoxy resin species containing one or some of the propargyl group, or a mixture of epoxy resin species containing one or some of the propargyl group and the carbon—carbon double bond. In this meaning, step (1) gives a resin composition containing the propargyl group, or containing the propargyl group and the carbon—carbon double bond.

In step (2), the propargyl-containing epoxy resin composition obtained in the above step (1) is reacted with a metal compound to thereby convert part of the propargyl group to the corresponding acetylide form. Said metal compound is preferably a transition metal compound capable of forming the acetylide, including complexes or salts of a transition metal such as copper, silver or barium. More specifically, there may be mentioned, for example, copper acetylacetonate, copper acetate, silver acetylacetonate, silver acetate, silver nitrate, barium acetylacetonate and barium acetate. Among them, copper or silver compounds are preferred from the ecofriendliness viewpoint, and copper compounds are more preferred because of their ready availability. For instance, copper acetylacetonate is suited for use in view of ease of bath control.

The reaction in said step (2) is generally carried out at 40 to 70° C. for several hours. The progress of the reaction can be checked by coloration of the resulting resin composition or by disappearance of methine proton signals in nuclear magnetic resonance spectroscopy. After confirming the time point of conversion of a desired proportion of the propargyl group in the resin composition into the acetylide form in that manner, the reaction is finished. The reaction product obtained is generally a mixture of epoxy resins with one propargyl group or a plurality of propargyl groups being in the acetylide form.

In step (3), sulfonium groups are introduced by reacting a sulfide/acid mixture with the epoxy groups remaining in the epoxy resin composition containing part of the propargyl group in the acetylide form as obtained in step (2). The sulfonium introduction can be carried out, for example, by subjecting a sulfide/acid mixture to react with epoxy group for sulfide introduction and sulfonium conversion, or by introducing a sulfide and then converting this sulfide to a sulfonium by reaction with an acid or an alkyl halide such as methyl fluoride, methyl chloride or methyl bromide, if necessary followed by anion exchange. From the viewpoint of ready availability of reactants, the method using a sulfide/acid mixture is preferred.

Said sulfide is not particularly restricted but can include, among others, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propnol and the like.

The acid mentioned above is not particularly restricted but can include, for example, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

Generally preferred as the proportions of the sulfide and acid in said sulfide/acid mixture are approximately sulfide/acid=100/60 to 100/100 on the mole basis.

The reaction in step (3) can be carried out, for example, by mixing the epoxy resin composition containing part of the propargyl group in the acetylide form as obtained in step (2) and the sulfide/acid mixture, for instance, in an amount sufficient to give the sulfonium group content specified above, with 5 to 10 moles, per mole of the sulfide, of water and then stirring generally at 50 to 90° C. for several hours. The end point of the reaction can advisably be judged by a residual acid value of not more than 5. The sulfonium introduction in the resin composition obtained can be confirmed by potentiometric titration.

In cases where sulfide introduction is followed by its conversion reaction to sulfonium group, the reaction can be carried out essentially under the same conditions as mentioned above.

In the production method of the present invention, the decomposition of the sulfonium group upon heating can be avoided by carrying out the sulfonium introduction after the propargyl introduction, as mentioned above,.

Since common reaction conditions may be selected for the above steps (2) and (3), it is also possible to carry out said steps (2) and (3) simultaneously. The method in which both the steps are carried out simultaneously is advantageous, because the production process can be simplified. A typical procedure for obtaining a propargyl-, sulfonium- and carbon—carbon double bond-containing resin composition for cationic electrocoating by the production process according to the present invention can be judiciously carried out, for example, by reacting an epoxy resin having at least two epoxy groups per molecule with a propargyl- and hydroxyl-containing compound to give a propargyl-containing epoxy resin composition (step (4)); reacting the remaining epoxy groups in the propargyl-containing epoxy resin composition obtained in step (4) with an unsaturated double bond- and carboxyl-containing compound to give a propargyl- and unsaturated double bond-containing epoxy resin composition (step (5)), and reacting the remaining epoxy groups in the propargyl- and unsaturated double bond-containing epoxy resin composition obtained in step (5) with an acid/sulfide mixture to introduce the sulfonium group thereinto (step (6)).

The thus-obtained propargyl-, sulfonium- and unsaturated double bond-containing resin composition for cationic electrocoating has, for example, a propargyl group content of 20 to 375 millimoles per 100 grams of resin composition solids, a sulfonium group content of 5 to 250 millimoles per 100 grams of resin composition solids, an unsaturated double bond content of 20 to 375 millimoles per 100 grams of resin composition solids, and a total content of the propargyl and sulfonium groups and unsaturated double bond of not more than 400 millimoles per 100 grams of resin composition solids.

Thus, by the production process of the present invention, it is possible to produce the propargyl- and sulfonium-containing or propargyl-, sulfonium- and carbon—carbon double bond-containing resin composition for cationic electrocoating which has a skeleton of epoxy resin and contains part of the propargyl group in the acetylide form, while preventing the sulfonium group from being decomposed. The resin composition obtained by this production process also constitutes an embodiment of the present invention. While acetylides in a dry state are explosive, the production process of the present invention is carried out in an aqueous medium and the desired substance is obtained as an aqueous composition, hence no safety problem arises.

The cationic electrocoating composition of the present invention contains the above resin composition for cationic electrocoating. In the cationic electrocoating composition of the present invention, said resin composition for cationic electrocoating itself has curability, hence the use of a curing agent is not always necessary. For further improving the curability, however, a curing agent may be used. As such curing agent, there may be mentioned, for example, compounds having a plurality of at least one member of propargyl group and carbon—carbon double bond, such as compounds derived from novolak phenol polyepoxides or pentaerythritol tetraglycidyl ether or the like by addition reaction of a propargyl-containing compound, such as propargyl alcohol, or a carbon—carbon double bond-containing compound, such as acrylic acid.

The cationic electrocoating composition of the present invention contains a catalyst metal introduced in the acetylide form and, therefore, the use of a curing catalyst is not necessary. However, for further improving the curability depending on the curing reaction conditions, a transition metal compound or the like, which is in general use, may judiciously be added as desired. Such compound is not particularly restricted but includes, among others, those resulting from binding of a ligand, such as cyclopentadiene or acetylacetone, or a carboxylic acid, such as acetic acid, or the like to transition metals such as nickel, cobalt, manganese, palladium and rhodium. Said curing catalyst is used preferably in an amount of 0.1 to 20 millimoles per 100 grams of cationic electrocoating composition solids.

An amine may be also incorporated in the cationic electrocoating composition of the present invention. The addition of the amine brings about an increased conversion of the sulfonium group to a sulfide by electrolytic reduction during the electrocoating process. Said amine is not particularly restricted but can include, for example, primary to tertiary monofunctional to polyfunctional aliphatic amines, alicyclic amines, aromatic amines and like amine compounds. Among them, water-soluble or water-dispersible ones are preferred, for example alkylamines containing 2 to 8 carbon atoms, such as monomethylamine, dimethylamine, trimethylamine, triethylamine, propylamine, diisopropylamine, tributylamine, etc.; monoethanolamine, diethanolamine, methylethanolamine, dimethylethanolamine, cyclohexylamine, morpholine, N-methylmorpholine, pyridine, pyrazine, piperidine, imidazoline, imidazole, etc. These may be used singly or two or more of them may be used in combination. Hydroxyamines such as monoethanolamine, diethanolamine and dimethylethanolamine are preferred among others because of their good aqueous dispersion stability.

Said amine can be incorporated directly in the cationic electrocoating composition of the present invention. In the case of conventional neutralization type amine-containing cationic electrocoating compositions, the addition of a free amine deprives the neutralizing acid in the resin, whereby the stability of the electrolyte bath is markedly worsened. To the contrary, no such bath stability disturbance is encountered according to the invention.

The level of said amine added is preferably 0.3 to 25 milliequivalents per 100 grams of the resin solids in the cationic electrocoating composition. When it is below 0.3 milliequivalents per 100 grams, any sufficient effect cannot be produced on the throwing power. The addition at a level above 25 milliequivalents per 100 grams is uneconomical, since an enhanced effect proportional to the high addition level cannot be expected. A more preferred range is 1 to 15 milliequivalents per 100 grams.

The cationic electrocoating composition of the present invention may contain, when necessary, one or more other ingredients used in ordinary cationic electrocoating compositions. Said other ingredients are not particularly restricted but include, for example, pigments, pigment dispersing resins, surfactants, antioxidants, ultraviolet absorbers and other coating additives.

Said pigments are not particularly restricted but include, for example, color pigments such as titanium dioxide, carbon black, iron oxide red, etc.; rust preventing pigments such as basic lead silicate, aluminum phosphomolybdate, etc.; extenders such as kaolin, clay, talc, etc.: and other pigments in general use in cationic electrocoating compositions.

The level of said pigments added is preferably 0 to 50% by weight relative to the nonvolatile matter in the cationic electrocoating composition.

Said pigment dispersing resins are not particularly restricted, but those pigment dispersing resins which are in general use can be used. Pigment dispersing resins containing sulfonium group and unsaturated bond therein may also be used. Such pigment dispersing resins containing sulfonium group and unsaturated bond can be obtained, for example, by reacting a sulfide compound with a hydrophobic epoxy resin obtained by reacting a bisphenol type epoxy resin with a half blocked isocyanate, or by reacting a sulfide compound with said resin in the presence of a monobasic acid and a hydroxyl-containing dibasic acid.

The cationic electrocoating composition of the present invention can be prepared by blending said resin composition for cationic electrocoating with the above-mentioned ingredients as necessary, followed by dissolution or dispersion in water. In using cationic electrocoating, said composition is preferably prepared so that the nonvolatile matter may amount to 10 to 30% of the bath liquid. Further, it is preferably prepared so that the content of the propargyl group, the carbon—carbon double bond and the sulfonium group may not deviate from the above respective ranges as regarding the resin composition.

In carrying out electrocoating using the cationic electrocoating composition of the present invention, the substrate is not particularly restricted provided that it is electroconductive. As the substrate, there may be mentioned, for example, iron sheets, steel sheets and aluminum sheets, with or without surface treatment, and shaped articles derived therefrom.

The electrocoating is generally carried out by applying a voltage of 50 to 450 V between the substrate as a cathode and an anode. When the voltage applied is less than 50 V, the electrodeposition will proceed insufficiently. When it is above 450 V, the electric power consumption will become uneconomically excessive. By using the composition of the present invention and applying an voltage in the range mentioned above, a uniform coating can be formed all over the substrate surface without any abrupt increase in film thickness during the electrodeposition process.

It is generally preferred that the temperature of the bath comprising the cationic electrocoating composition when the above voltage is applied be preferably 10 to 45° C.

The electrodeposition process preferably comprises: (i) a step of immersing the substrate in the cationic electrocoating composition, (ii) a step of applying a voltage between the substrate as a cathode and an anode to thereby cause a coating to deposit and (iii) a step of further applying a voltage to said coating to thereby increasing the electric resistance per unit volume of the coating. The period of voltage application may vary depending on the electrodeposition conditions but, generally, it may be 2 to 4 minutes.

After completion of the electrodeposition process, the electrocoatings obtained in the above manner, either as such or after washing with water, are baked for curing at 120 to 260° C., preferably 160 to 220° C., for 10 to 30 minutes to complete the coating process.

When the cationic electrocoating composition of the present invention is used, the electrocoatings after curing preferably have a thickness of 10 to 25 $\mu$m. If it is less than 10 $\mu$m, the anti-corrosion effect will be insufficient. If it exceeds 25 $\mu$m, the coating composition will be wasted. With the cationic electrocoating composition of the present invention, the coatings formed on substrate surfaces by electrodeposition are converted to nonconductors by the electrolytic reduction reaction mentioned above, resulting in a great improvement in throwing power. Therefore, even when the film thickness is within the above range, uniform coatings can be formed all over the substrates and thus a satisfactory corrosion resistance effect can be produced.

The thus-coated substrates are further provided with a necessary intermediate coat and/or a top coat according to the intended use. In the case of automotive coating, for instance, a solvent- or water-base or powder intermediate coating composition is generally applied and baked to provide chipping resistance and, furthermore, the two-coat one-bake coating method is applied which comprises the so-called wet-on-wet coating technique of applying a base coating composition and, without curing this, applying a clear coating composition, followed by baking the resulting coatings simultaneously. On that occasion, it is preferred, from the environment protection viewpoint, that a water-base coating composition be used as said base coating composition and a powder coating composition be used as said clear coating composition. In addition to this, it is of course possible to apply a solid type coating composition using the one-coat coating technique.

BEST MODES FOR CARRYING OUT THE INVENTION

The following examples illustrate the present invention in further detail. They are, however, by no means limitative of the scope of the present invention.

PRODUCTION EXAMPLE 1

Production of a Sulfonium-, Propargyl- and Copper Acetylide-Containing Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 23.6 g of propargyl alcohol and 0.3 g of dimethylbenzylamine, the temperature was raised to 105°

C., and the reaction was carried out for 3 hours to give a propargyl-containing resin composition with an epoxy equivalent of 1,580. Thereto was added 2.5 g of copper acetylacetonate, and the reaction was carried out at 90° C. for 1.5 hours. It was confirmed by proton (1H) NMR that the terminal hydrogen of the propargyl group added had disappeared in part (corresponding to 14 millimoles per 100 grams of the nonvolatile matter in the resin composition). To this was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 43.8 g of deionized water was added to give the desired resin composition solution. This was a varnish having a solids content of 70.0% by weight and a sulfonium value of 28.0 millimoles per 100 grams. The number average molecular weight (polystyrene equivalent as determined by GPC) was 2,443.

COMPARATIVE PRODUCTION EXAMPLE 1

Process for Producing Sulfonium- and Propargyl-Containing, Copper Acetylide Group-free Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 23.6 g of propargyl alcohol and 0.3 g of dimethylbenzylamine. The temperature was raised to 105° C. and the reaction was allowed to proceed for 3 hours to give a propargyl-containing resin composition with an epoxy equivalent of 1,580. To this was added 10.6 g of 1-(2-hydroxyethylthio)-2,3-propanediol, 4.7 g of glacial acetic acid and 7.0 g of deionized water, and the reaction was allowed to proceed for 6 hours while maintaining the temperature at 75° C. After confirming that the residual acid value was not more than 5, 45.5 g of deionized water was added to give the desired resin composition solution. This had a solids concentration of 71.0% by weight and a sulfonium value of 28.5 millimoles per 100 grams of varnish. The number average molecular weight (polystyrene equivalent as determined by GPC) was 2,433.

EXAMPLE 2

Production of Sulfonium-, Propargyl-, Long Chain Unsaturated Fatty Acid Residue- and Copper Acetylide Group-Containing Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.2 g of dimethylbenzylamine. The temperature was raised to 105° C. and the reaction was allowed to proceed for 1 hour to give a propargyl-containing resin composition with an epoxy equivalent of 445. To this was added 50.6 g of linolic acid and an additional 0.1 g portion of dimethylbenzylamine and the reaction was further allowed to proceed at the same temperature for 3 hours, to give a propargyl- and long chain unsaturated fatty acid residue-containing resin composition with an epoxy equivalent of 2,100. To this was added 3.2 g of copper acetylacetonate and the reaction was allowed to proceed at 90° C. for 1.5 hours to give the corresponding resin composition containing part of the propargyl group in the copper acetylide form. Disappearance of part of the terminal hydrogen atom of the propargyl group added was confirmed by proton (1H) NMR (the content of the acetylide-form propargyl group corresponding to 14 millimoles per 100 grams of resin solids). To this was added 10.6 g of 1-(2-hydroxyethylthio)-2,3-propanediol, 4.7 g of glacial acetic acid and 7.0 g of deionized water, and the reaction was allowed to proceed for 6 hours while maintaining the temperature at 75° C. After confirming that the residual acid value was not more than 5, 60.8 g of deionized water was added to give the desired resin composition solution. This had a solids concentration of 70.6% by weight and a sulfonium value of 23.1 millimoles per 100 grams of varnish. The number average molecular weight (polystyrene equivalent as determined by GPC) was 3,119.

COMPARATIVE PRODUCTION EXAMPLE 2

Production of a Sulfonium-, Propargyl- and Long-Chain Unsaturated Fatty Acid Residue-Containing Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.2 g of dimethylbenzylamine, the temperature was raised to 105° C., and the reaction was carried out for 1 hour to give a propargyl-containing resin composition with an epoxy equivalent of 445. Thereto was added 50.6 g of linolic acid and an additional 0.1 g of dimethylbenzylamine, and the reaction was continued at the same temperature for 3 hours, to give a propargyl- and long-chain unsaturated fatty acid residue-containing resin composition with an epoxy equivalent of 2,100. Thereto was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 62.9 g of deionized water was added to give the desired resin composition solution. This was a varnish having a solids content of 69.3% by weight and a sulfonium value of 23.5 millimoles per 100 grams. The number average molecular weight (polystyrene equivalent as determined by GPC) was 3,106.

EXAMPLE 3

Production of Sulfonium-, Propargyl-, Methacryloyl- and Copper Acetylide Group-Containing Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.3 g of dimethylbenzylamine. The temperature was raised to 105° C. and the reaction was allowed to proceed for 3 hours. The contents were cooled to 70° C., and a mixture of 15.5 g of methacrylic acid and 0.1 g of hydroquinone was added dropwise over 30 minutes. Upon completion of dropping of the whole amount, the temperature was raised to 90° C. and the reaction was allowed to proceed at that temperature for 2 hours to give a propargyl- and methacryloyl-containing resin composition with an epoxy equivalent of 1,655. To this was added 2.6 g of copper acetylacetonate and the reaction was allowed to proceed at 90° C. for 1.5 hours. Disappearance of part of the terminal hydrogen atom of the propargyl group added was confirmed by proton (1H) NMR (the content of the acetylide-form propargyl group corresponding to 14 millimoles per 100 grams of resin solids). To this was added 10.6 g of 1-(2-hydroxyethylthio)-2,3-propanediol, 4.7 g of glacial acetic acid and 7.0 g of deionized water, and the reaction was allowed to proceed for 6 hours while maintaining the temperature at 75° C. After confirming that the residual acid value was not more than 5, 47.8 g of deionized water was added to give the desired resin composition solution. This had a solids concentration of 70.0% by weight and a sulfonium value of 27.4 millimoles per 100 grams of varnish. The number average molecular weight (polystyrene equivalent as determined by GPC) was 2,523. The contents of the propargyl group and carbon—carbon double bond as determined by constructing IR spectrum-based calibration curves were 172.2 millimoles per 100 grams of resin solids and 129.2 millimoles per 100 grams of resin solids, respectively.

EXAMPLE 4

Production of Sulfonium-, Propargyl-, Vinyl- and Copper Acetylide Group-Containing Resin Composition for Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol, 10.5 g of allyl alcohol, 0.05 g of hydroquinone and 0.3 g of dimethylbenzylamine. The temperature was raised to 105° C. and the reaction was allowed to proceed for 3 hours to give a propargyl- and vinyl-containing resin composition with an epoxy equivalent of 1,590. To this was added 2.5 g of copper acetylacetonate and the reaction was allowed to proceed at 90° C. for 1.5 hours. Disappearance of part of the terminal hydrogen atom of the propargyl group added was confirmed by proton (1H) NMR (the content of the acetylide-form propargyl group corresponding to 14 millimoles per 100 grams of resin solids). To this was added 10.6 g of 1-(2-hydroxyethylthio)-2,3-propanediol, 4.7 g of glacial acetic acid and 7.0 g of deionized water, and the reaction was allowed to proceed for 6 hours while maintaining the temperature at 75° C. After confirming that the residual acid value was not more than 5, 45.6 g of deionized water was added to give the desired resin composition solution. This had a solids concentration of 70.9% by weight and a sulfonium value of 27.6 millimoles per 100 grams of varnish. The number average molecular weight (polystyrene equivalent as determined by GPC) was 2,439. The contents of the propargyl group and carbon—carbon double bond as determined by constructing IR spectrum-based calibration curves were 178.7 millimoles per 100 grams of resin solids and 134.0 millimoles per 100 grams of resin solids, respectively.

EXAMPLE 5

A cationic electrocoating composition was prepared by adding 157.1 g of deionized water to 142.9 g of the sulfonium-, propargyl- and copper acetylide group-containing resin composition for cationic electrocoating as obtained in Example 1, stirring the mixture in a high-speed rotary mixer for 1 hour and further adding 373.3 g of deionized water to adjust the solids concentration to 15% by weight.

EXAMPLE 6

A cationic electrocoating composition was prepared by adding 158.4 g of deionized water to 141.6 g of the sulfonium-, propargyl-, long chain unsaturated fatty acid residue- and copper acetylide group-containing resin composition for cationic electrocoating as obtained in Example 2, stirring the mixture in a high-speed rotary mixer for 1 hour and further adding 373.3 g of deionized water to adjust the solids concentration to 15% by weight.

EXAMPLE 7

A cationic electrocoating composition was prepared by adding 156.2 g of deionized water to 142.9 g of the sulfonium-, propargyl-, methacryloyl- and copper acetylide group-containing resin composition for cationic electrocoating as obtained in Example 3, stirring the mixture in a high-speed rotary mixer for 1 hour, and further adding 373.3 g of deionized water to adjust the solids concentration to 15% by weight.

EXAMPLE 8

A cationic electrocoating composition was prepared by adding 158.0 g of deionized water to 141.0 g of the sulfonium-, propargyl-, vinyl- and copper acetylide group-containing resin composition for cationic electrocoating as obtained in Production Example 2, stirring the mixture in a high-speed rotary mixer for 1 hour, and further adding 373.3 g of deionized water to adjust the solids concentration to 15% by weight.

COMPARATIVE EXAMPLE 1

A cationic electrocoating composition was prepared by adding 1.9 g of copper acetylacetonate and 157 g of deionized water to 140.8 g of the sulfonium- and propargyl-containing, copper acetylide group-free resin composition for cationic electrocoating as obtained in Comparative Production Example 1, stirring the mixture in a high-speed rotary mixer for 1 hour, and further adding 373.3 g of deionized water to adjust the solids concentration to 15% by weight.

COMPARATIVE EXAMPLE 2

A cationic electrocoating composition was prepared by adding 1.8 g of copper acetylacetonate and 153.9 g of deionized water to 144.3 g of the sulfonium-, propargyl- and long chain unsaturated fatty acid residue-containing resin composition for cationic electrocoating as obtained in Comparative Production Example 2, stirring the mixture in a high-speed rotary mixer for 1 hour, and further adding 373.3 g of deionized water to adjust the solids concentration to 15% by weight.

EVALUATION (1) Gel Fraction

Using each of the cationic electrocoating compositions obtained in the examples and comparative examples, electrocoating was carried out with a zinc phosphate-treated cold-rolled steel sheet (JIS G 3141 SPCC-SD, treated with Surfdyne SD-5000 (trademark, product of Nippon Paint) as the cathode and a stainless steel vessel as the anode. Each coated sheet was taken out of the electrolyte bath, washed with water and baked at 160° C. for 20 minutes to give an electrodeposited coating. The thus-obtained coating was placed in a Soxhlet extractor and extracted using an acetone-methanol (1:1 by weight) mixture under reflux for 6 hours. The gel fraction of the coating was calculated as follows:

Gel fraction (%)=[weight before extraction/weight after extraction]×100

The results thus obtained are shown in Table 1.

(2) Change in Coating Compositions with Time

The cationic electrocoating compositions obtained in the examples and comparative examples were each placed in a 500-ml measuring cylinder and, without stirring, allowed to stand for 72 hours. After standing, each cationic electrocoating composition was fractionated by filtering through a 200-mesh filter net and the state of filtration was observed by the eye. The results thus obtained are shown in Table 1. The evaluation criteria were as follows.

O: No filtration residue;

X: Much filtration residue.

(3) Throwing Power

Using the four sheet box method illustrated in FIG. 1, the film thickness ratio between face G and face A, namely the G/A value (%), was determined. The results obtained are shown in Table 1. From the results shown in Table 1, it was revealed that the throwing power was always above 85% when the cationic electrocoating compositions obtained in the examples were used, indicating a marked improvement as compared with the conventional formic acid-neutralized electrocoating compositions.

TABLE 1

| | Gel fraction (%) after baking at 160° C. × 20 min. | State of coating after the lapse of 72 hours | Amount of acetylide introduced* | Throwing power G/A (%) |
|---|---|---|---|---|
| Example 1 | 97 | O: No filtration residue | 7.2 | 94.1 |
| Example 2 | 99 | O: No filtration residue | 7.0 | 89.7 |
| Example 3 | 97 | O: No filtration residue | 7.1 | 93.3 |
| Example 4 | 95 | O: No filtration residue | 7.2 | 89.3 |
| Comparative Example 1 | 80 | X: Much precipitate, not redispersible | 0 | 90.5 |
| Comparative Example 2 | 98 | X: Precipitate found | 0 | 92.6 |

*(mmol per 100 g of the nonvolatile matter in the resin composition)

EFFECTS OF THE INVENTION

The resin composition for cationic electrocoating of the present invention, which has the constitution mentioned hereinabove, can realize a high level of throwing power and is excellent in curability, so that those difficulties encountered in bath control and coating composition preparation when an organic transition metal complex or organic acid transition metal salt is incorporated can be overcome. Therefore, even a hardly soluble transition metal complex or the like can be used and the bath control during electrocoating becomes easy. When said composition contains unsaturated double bond, the curability can be further improved and a sufficient level of curing can be attained even under mild baking/curing conditions.

The process of the present invention for producing the resin composition for cationic electrocoating can produce the resin composition for cationic electrocoating of the present invention in a very simple and easy manner while preventing the sulfonium group from being decomposed and therefore is very suited for use as an industrial production process. The cationic electrocoating composition of the present invention realizes a high level of throwing power and of bath stability simultaneously and can provide cured coatings with excellent physical characteristics.

What is claimed is:

1. An acetylide-form propargyl-containing resin composition for cationic electrocoating, which comprises a resin having a skeleton of epoxy resin and has a number average molecular weight of 500 to 20,000, and which contains, per 100 grams of the resin composition solids, 5 to 400 millimoles of sulfonium group and 10 to 495 millimoles of propargyl group, the total content of the sulfonium and propargyl groups being not more than 500 millimoles per 100 grams of the resin composition solids, said propargyl group being partly in the form of an acetylide in an amount of from 0.1 to 40 millimoles per 100 grams of the resin composition solids.

2. The resin composition for cationic electrocoating as claimed in claim 1, wherein the metal contained in the acetylide-form propargyl group is at least one metal selected from the group consisting of copper, silver and barium.

3. The resin composition for cationic electrocoating as claimed in claim 1, wherein the content of the acetylide-form propargyl group is 0.1 to 20 millimoles per 100 grams of the resin composition solids and the metal is copper.

4. The resin composition for cationic electrocoating as claimed in claim 2, wherein the epoxy resin is a novolak phenol epoxy resin or novolak cresol epoxy resin, and which has a number average molecular weight of 700 to 5,000 and contains, per 100 grams of the resin composition solids, 5 to 250 millimoles of the sulfonium group and 20 to 395 millimoles of the propargyl group, the total content of the sulfonium and propargyl groups being not more than 400 millimoles per 100 grams of the resin composition solids.

5. The resin composition for cationic electrocoating as claimed in claim 1, wherein the epoxy resin is a novolak phenol epoxy resin or novolak cresol epoxy resin, and which has a number average molecular weight of 700 to 5,000 and contains, per 100 grams of the resin composition solids, 5 to 250 millimoles of the sulfonium group and 20 to 395 millimoles of the propargyl group, the total content of the sulfonium and propargyl groups being not more than 400 millimoles per 100 grams of the resin composition solids.

6. A cationic electrocoating composition which comprises the resin composition for cationic electrocoating as defined in claim 1.

7. A resin composition for cationic electrocoating, which comprises a resin having a skeleton of epoxy resin and has a number average molecular weight of 500 to 20,000, and which contains, per 100 grams of the resin composition solids, 5 to 400 millimoles of sulfonium group, 10 to 485 millimoles of propargyl group and 10 to 485 millimoles of unsaturated double bond, the total content of the sulfonium and propargyl groups and the unsaturated double bond being not more than 500 millimoles per 100 grams of the resin composition solids, said propargyl group being partly in the form of an acetylide in an amount of from 0.1 to 40 millimoles per 100 grams of the resin composition solids.

8. The resin composition for cationic electrocoating as claimed in claim 7, wherein the metal contained in the acetylide-form propargyl group is at least one metal selected from the group consisting of copper, silver and barium.

9. The resin composition for cationic electrocoating as claimed in claim 7, wherein the content of the acetylide-form propargyl group is 0.1 to 20 millimoles per 100 grams of the resin composition solids and the metal is copper.

10. The resin composition for cationic electrocoating as claimed in claim 7, wherein the total content of the propargyl group and unsaturated double bond is 80 to 450 millimoles per 100 grams of the resin composition solids.

11. The resin composition for cationic electrocoating as claimed in claim 7, wherein the epoxy resin is a novolak phenol epoxy resin or novolak cresol epoxy resin, and which has a number average molecular weight of 700 to 5,000 and contains, per 100 grams of the resin composition solids, 5 to 250 millimoles of the sulfonium group, 20 to 375 millimoles of the propargyl group and 20 to 375 millimoles of the unsaturated double bond, the total content of the sulfonium and propargyl groups and unsaturated double bond being not more than 400 millimoles per 100 grams of the resin composition solids.

12. The resin composition for cationic electrocoating as claimed in claim 11, wherein the total content of the propargyl group and unsaturated double bond is 100 to 395 millimoles per 100 g of the resin composition solids.

13. A cationic electrocoating composition which comprises the resin composition for cationic electrocoating as defined in claim 7.

* * * * *